US010900777B2

(12) United States Patent
Christoph et al.

(10) Patent No.: US 10,900,777 B2
(45) Date of Patent: Jan. 26, 2021

(54) METHOD AND DEVICE FOR DETERMINING THE GEOMETRY OF STRUCTURES BY MEANS OF COMPUTER TOMOGRAPHY

(71) Applicant: WERTH MESSTECHNIK GMBH, Giessen (DE)

(72) Inventors: Ralf Christoph, Giessen (DE); Ingomar Schmidt, Erfurt (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 336 days.

(21) Appl. No.: 14/763,286

(22) PCT Filed: Jan. 24, 2014

(86) PCT No.: PCT/EP2014/051375
§ 371 (c)(1),
(2) Date: Jul. 24, 2015

(87) PCT Pub. No.: WO2014/114737
PCT Pub. Date: Jul. 31, 2014

(65) Prior Publication Data
US 2015/0355113 A1    Dec. 10, 2015

(30) Foreign Application Priority Data

Jan. 25, 2013  (DE) .......................... 10 2013 100 774
May 2, 2013    (DE) .......................... 10 2013 104 490

(51) Int. Cl.
*G01B 15/00*     (2006.01)
*G01B 5/008*     (2006.01)
(Continued)

(52) U.S. Cl.
CPC ............. *G01B 15/00* (2013.01); *G01B 5/008* (2013.01); *G01B 15/045* (2013.01); *G01N 23/046* (2013.01); *G01N 2223/419* (2013.01)

(58) Field of Classification Search
CPC ..... A61B 6/5282; A61B 6/032; A61B 6/5247; A61B 6/582; A61B 6/583; G01N 23/046;
(Continued)

(56) References Cited

U.S. PATENT DOCUMENTS 3,920,999 A  *  11/1975  Drexler ................... H01J 35/02
                                                          378/119
4,969,110 A  *  11/1990  Little ...................... G01N 23/046
                                                          348/26
(Continued)

FOREIGN PATENT DOCUMENTS

CN      101023322 A     8/2007
CN      101802542 A     8/2010
(Continued)

OTHER PUBLICATIONS

Machine translation of WO 2007003441.*
(Continued)

*Primary Examiner* — Dani Fox
*Assistant Examiner* — Soorena Kefayati
(74) *Attorney, Agent, or Firm* — Ladas & Parry LLP; Malcolm J. MacDonald

(57) ABSTRACT

A method for determining the geometry of a structure on an object at least by using a computer tomography sensor system comprising at least a radiation source, a mechanical axis of rotation, and a detector, preferably a planar detector, wherein surface measurement points are generated by the computer tomography sensor system, for example in the region of material transitions. In order to select the surface measurement points to be used for the determination of a
(Continued)

geometry feature by using any target geometry, in particular without the availability of a CAD model being necessary, according to the invention, in order to determine the geometry features, surface measurement points are used which are associated with the geometry features to be determined on the basis of specifiable rules and the geometry features are determined from the associated surface measurement points.

24 Claims, 3 Drawing Sheets

(51) Int. Cl.
*G01N 23/046* (2018.01)
*G01B 15/04* (2006.01)

(58) Field of Classification Search
CPC .. G01N 23/10; G01N 23/18; G01N 2223/303; G01N 2223/3035; G01N 2223/323; G01N 2223/645; G01N 2223/646; G01N 2223/6462; G01N 2223/6466; G01B 15/00; G01B 15/045; G01B 15/008
See application file for complete search history.

(56) References Cited

U.S. PATENT DOCUMENTS

| | | | |
|---|---|---|---|
| 5,442,674 A * | 8/1995 | Picard | A61B 6/583 378/18 |
| 5,712,895 A * | 1/1998 | Negrelli | A61B 6/583 378/207 |
| 5,715,167 A * | 2/1998 | Gupta | G05B 19/401 700/184 |
| 6,047,041 A * | 4/2000 | Ellinger | G01N 23/02 378/58 |
| 6,091,795 A * | 7/2000 | Schafer | A61B 6/032 250/370.11 |
| 6,320,931 B1 * | 11/2001 | ARnold | G01N 23/046 378/56 |
| 6,418,193 B1 * | 7/2002 | Albagli | A61B 6/4035 378/158 |
| 6,484,049 B1 * | 11/2002 | Seeley | A61B 90/36 600/246 |
| 6,519,860 B1 * | 2/2003 | Bieg | B23H 7/26 33/1 PT |
| 6,651,351 B1 * | 11/2003 | Christoph | G01B 11/007 33/503 |
| 6,991,371 B2 * | 1/2006 | Georgeson | G01T 1/169 378/18 |
| 7,147,373 B2 * | 12/2006 | Cho | A61B 6/547 378/207 |
| 7,706,501 B2 * | 4/2010 | Vizard | G01N 23/087 378/54 |
| 7,714,304 B2 * | 5/2010 | Poglitsch | G01N 23/046 250/491.1 |
| 7,775,715 B2 * | 8/2010 | Warner | G01N 23/046 378/207 |
| 7,792,242 B2 * | 9/2010 | Kamegawa | G01N 23/046 378/20 |
| 8,165,839 B2 * | 4/2012 | Boese | A61B 5/062 702/85 |
| 8,189,889 B2 * | 5/2012 | Pearlstein | G06T 15/08 382/128 |
| 8,777,485 B2 * | 7/2014 | Holt | A61B 6/03 378/207 |
| 9,025,855 B1 * | 5/2015 | Christoph | G01N 23/046 382/152 |
| 9,420,983 B2 * | 8/2016 | Zagorchev | A61B 6/504 |
| 9,429,665 B2 * | 8/2016 | Jobst | A61B 6/027 |
| 9,826,953 B2 * | 11/2017 | Siewerdsen | A61B 6/505 |
| 2008/0020332 A1 | 1/2008 | Lavenda et al. | |
| 2008/0075227 A1 * | 3/2008 | Christoph | A61B 6/584 378/23 |
| 2009/0074136 A1 * | 3/2009 | Kamegawa | G01N 23/046 378/20 |
| 2010/0145653 A1 * | 6/2010 | Christoph | G01B 21/04 702/152 |
| 2010/0312524 A1 | 12/2010 | Siercks et al. | |
| 2012/0155606 A1 * | 6/2012 | Simon | G01N 23/046 378/19 |
| 2012/0262550 A1 | 10/2012 | Bridges | |
| 2013/0195255 A1 * | 8/2013 | Avila | A61B 6/583 378/207 |
| 2013/0230150 A1 * | 9/2013 | Weiss | G01T 7/005 378/207 |
| 2013/0259347 A1 * | 10/2013 | Schmitt | G01N 23/046 382/131 |
| 2015/0173703 A1 * | 6/2015 | Siewerdsen | A61B 6/583 378/20 |

FOREIGN PATENT DOCUMENTS

| | | | | |
|---|---|---|---|---|
| CN | 103688132 A | 3/2014 | | |
| DE | 102005032686 A1 | 1/2007 | | |
| DE | 102005032687 A1 | 1/2007 | | |
| DE | 10 2007 044 000 A1 | 4/2009 | | |
| DE | 10 2007 047 499 A1 | 4/2009 | | |
| EP | 1 792 687 A1 | 6/2007 | | |
| EP | 2282165 A2 | 2/2011 | | |
| JP | 2008020344 A | 1/2008 | | |
| WO | WO 2007003441 A1 * | 1/2007 | ........... | G06T 7/0006 |
| WO | WO-2007003441 A1 * | 1/2007 | ............... | G06T 7/74 |
| WO | 2008083993 A1 | 7/2008 | | |
| WO | 2008128978 A2 | 10/2008 | | |
| WO | 2012152809 A2 | 11/2012 | | |

OTHER PUBLICATIONS

Machine translation of WO-2007003441-A1 (Year: 2007).*
UK Examination Report dated Feb. 21, 2017 for Application No. GB 1513356.4.
Espacenet English abstract of DE 10 2007 044 000 A1.
International Office Action dated Aug. 6, 2014, corresponding to International Patent Application No. PCT/EP2014/051375.
Examination Report dated Sep. 25, 2017, for Application No. GB 1513356.4.
Chinese Office Action dated May 11, 2107 for Chinese Application No. 201480005933.8.
Espacenet English abstract of CN 101023322 A.
Espacenet English abstract of CN 101802542 A.
Espacenet English abstract of CN 103688132 A.

* cited by examiner

METHOD AND DEVICE FOR DETERMINING THE GEOMETRY OF STRUCTURES BY MEANS OF COMPUTER TOMOGRAPHY

This application is a 371 of PCT/EP2014/051375, filed on Jan. 24, 2014, which claims priority to German Application No. 10 2013 100 774.0, filed Jan. 25, 2013 and German Application No. 10 2013 104 490.5, filed May 2, 2013.

SUMMARY OF THE INVENTION

The invention relates to a method and a device for determining the geometry of structures on objects such as workpieces or tools by means of computer tomography.

BACKGROUND OF THE INVENTION

In the field of coordinate measuring technology, computer tomography is understood to be the three-dimensional investigation of a workpiece with the objective of determining the positions of measurement points at interfaces between two materials, such as at the surface, that is, the transition between the workpiece and air. To this end, the workpiece to be measured is permeated by the measurement radiation, wherein an attenuation of the measurement radiation occurs as a function of the penetrated distance and penetrated material. The radiation exiting behind the workpiece is captured by a radiation detector. Said detector is typical planar in design in order to simultaneously capture as great a region of the workpiece as possible. Using radiographic images recorded in hundreds or thousands of rotational orientation of the workpiece disposed on a rotary table (mechanical axis of rotation), mathematical reconstruction methods are used to first obtain volume information comprising the local attenuation information of the workpiece. The measurement points are then computed from said information, typically by means of a threshold value process.

In order to set up the rotational orientations of the rotary table, referred to as the mechanical axis of rotation, said table comprises a fixed and a rotating part. Whenever reference is made to the rotation or rotational orientation of the mechanical axis of rotation, it follows that the rotating part is always meant. The rotating part is thereby rotated about a mathematical axis, referred to below as simply the "axis of rotation". The orientation, that is the direction and location of a point, for example, of said axis of rotation in space is also referred to as the location of the axis of rotation. If the direction of the mechanical axis of rotation is referred to, then the direction of the (mathematical) axis of rotation is also meant thereby. The position of the mechanical axis of rotation, however, refers to the position in space at which the entire mechanical axis of rotation, that is the fixed and the rotating part, is disposed. If the position of the mechanical axis of rotation is changed, such as in one of the three lateral directions x, y, and z perpendicular to each other, then the location of the (mathematical) axis of rotation must also change, but only in that said axis is displaced in parallel, that is, the orientation thereof does not change.

Due to their high radiographic transparency and typically lower precision requirements, mostly plastic parts or light metal parts are measured using computer tomography. If, however, steel parts such as fuel injectors of diesel or gasoline engines are to be measured, for example, then artifacts and therefore measurement errors occur more often due to the scattered radiation and other effects that occur more severely in steel. In addition, the features on such parts, such as the injection orifices, typically have very low tolerances in the single-digit micrometer range. Special measures must therefore be taken in order to achieve high precision. The specified dimensions and the specified geometry of said features are often additionally defined or calibrated by measuring a master part.

The object of the present invention is to avoid the disadvantages of the prior art, particularly to obtain high precision when measuring workpieces having low radiographic transparency. A further object is to ensure rapid and precise series measurements.

Because a large number of surface points are generated by means of computer tomography and are typically distributed over large regions of the workpiece, thus covering a plurality of features and the regions between different features, it is particularly important to capture those measurement points associated with each feature. If adjacent points that are not part of the feature are otherwise included when determining a geometry element, then measurement deviations will occur.

A partial and very special solution for said object is provided by the method described in WO 2008/128978 A2 under the keyword of CAD patches. Here the measurement points that can be associated with a CAD element of the workpiece are selected for determining features. A fit to a CAD model is first needed for this, however. In addition, corresponding 3D models are not always available for many workpieces, such as for fuel injectors. For said workpieces, typically only 2D drawings or tables from which so-called parameter sets or parameter files can be derived according to the invention are available, for example having the angular orientations and diameter courses of the injection orifices, that is, only for details of the workpiece.

The object of the present invention is therefore also to select the surface measurement points to be used for determining a geometry feature using an arbitrary specified geometry, particularly without requiring the presence of a CAD model.

One consideration of the invention achieves this object, in that the surface points are selected that are associated with the geometric features to be determined on the basis of specifiable rules, particularly within a maximum specifiable distance from a specified geometry, wherein the inner and outer sides are defined, preferably using the directional information of the specified geometry, that is, of the surface vector, and the same is used for selecting the surface points.

The specifiable rules are thereby defined by the operator. The operator thereby makes the selection, for example, of what type of geometry element, such as a cylinder or plane or sphere, etc., is to be used, in order to define a specified geometry of the geometry feature to be determined.

The operator also defines the location and orientation of the specified geometry in space, either by entering the corresponding parameters for the geometry element, or optionally by means of a computer program.

The specified geometry is then used according to the invention in order to determine the distance to the surface points. For example, the minimum perpendicular distance from the specified geometry is thereby determined for each surface point. Applying the maximum value for said distance specified by the operator, for example 100 µm, preferably 50 µm, then only the surface points whose distance is less than the maximum value are selected for determining the geometry feature. The maximum value is defined by the operator based on experience with respect to the drawing tolerance for the feature to be measured.

The object of the invention is substantially achieved by a method for determining the geometry of a structure on an object such as a workpiece or a tool at least by using a computer tomography sensor system comprising at least a radiation source, a mechanical axis of rotation, and a detector, preferably a planar detector, the computer tomography sensor system generating surface measurement points, preferably in the region of material transitions, in that surface measurement points associated with the geometry features to be determined on the basis of specifiable rules are used for determining the geometric features.

The measurement of fuel injectors is of particular significance, because often no CAD model is available for the same and an unambiguous fit to the typically rotationally symmetrical design is also not possible. An independent object of the invention is therefore to measure fuel injectors, particularly the injection orifices thereof. For example, the elevation angle, azimuth angle, location in space, diameter, diameter course, or roughness of individual injection orifices are thereby determined According to the invention, the measurement results for said workpieces can also be determined by means of further sensors, such as optical, tactile, or tactile-optical sensors, as are known in the field of coordinate measuring technology. The measurement results of the various sensors are also combined.

According to the invention, therefore, the geometry of a structure on an object such as a workpiece or a tool is determined at least by using a computer tomography sensor system comprising at least a radiation source, a mechanical axis of rotation, and a detector, preferably a planar detector, the computer tomography sensor system generating surface measurement points, preferably in the region of material transitions, in that one or more features oriented at an angle in space, such as holes, are measured, preferably with respect to the axis of symmetry of the object.

At an angle in space thereby means that the orientation of the features, such as the cylindrical axis of a cylinder, that is, a direction in space that can be associated with the feature, varies. This is the case for cylindrical or nearly cylindrical injection orifices of fuel injectors, for example.

In order to represent a specified geometry, said geometry must be made of and comprise basic geometry elements. These include, for example, the line, line segment, circle, circular segment, sphere, spherical segment, cylinder, cylindrical segment, cone, conical segment, torus, and toroidal segment. One or more so-called CAD elements can be generated from said basic elements or combined basic elements, having the same data format as a CAD model, whereby existing measurement programs based on CAD data can be used. Said CAD elements are not, however, previously known CAD models, such as can be derived from a 3D model of the workpiece, for example. The CAD elements meant here are derived from actually measured measurement points, such as by a best fit or calculation of a geometric best fit element, or by entering the parameters thereof, such as by an operator by reading from a 2D drawing or a table, as so-called parameter sets. Said parameter sets comprise three spatial coordinates (x, y, z) and at least one angular orientation (phi, theta) or axis orientation (dx, dy, dz), or a plane (x, y, z as point information and dx, dy, dz as plane normal vector), and optionally further geometry elements defined in space and preferably limited in extent, for example for defining injection orifice geometries or the location of one or more injection orifices. By means of said specified data, such as angular orientations, positions, and diameters or diameter courses, so-called manual elements are then also defined.

The CAD elements or manual elements define the specified geometry or a portion thereof. Not being dependent on a conventional CAD model is a distinguishing feature of the invention in contrast to the prior art.

A further important consideration of the specified geometry is the difference between the inner side and outer side. This is necessary because the basic geometry elements define only the shell of a spatially defined region. Thus, for example, a cylinder element can represent a solid cylinder, but also a hole. Only by adding a directional vector such as a surface vector is the specified geometry thus completely defined. It is thus possible to differentiate the inside and outside and to associate surface points to the specified geometry accordingly.

An iterative process for determining the measurement points associated with a feature from all of the existing measurement points can also be implemented. The specified geometry is thereby first roughly defined. This means that the operator defines a type of geometry element and any existing orientation and size, such as the diameter of a cylinder, based on his previous knowledge of the present feature, such as that said feature has a cylindrical shape, a conical shape, or a flat shape. The operator thereby typically has tools available. For example, individual points that can be confidently associated with the feature in question can be selected by the user in order to calculate a best fit element means of a computer program. Said element can then be used as a roughly defined specified geometry. If the location of the workpiece is known, for example calibrated, then the operator can use specified data from 2D drawings or tabulated existing information about the workpiece in order to manually generate specified geometry elements. The calibration thereby includes determining the location of the workpiece with respect to the sensor, such as in a coordinate measuring machine. Typically the workpiece comprises geometry features that can be unambiguously associated therewith. In case of partially rotationally symmetrical fuel injectors, markings such as laser marking lines or the like, or grooves, typically on the outside, or eccentric holes are made in order to be able to determine the orientation or rotational orientation in a fixture. The operator also uses adjacent features for orientation, such as planes adjacent to the one cylinder for a through hole.

Said features can be used for defining the feature to be actually measured, even if not all measurement points associated with the adjacent measurement points have been computed precisely enough. Said feature is then trimmed, for example. The formation of intersections of geometry elements is also sensible under some circumstances for defining the roughly determined specified geometry or the roughly determined geometry element. A cylinder element can, for example, be bounded in length as a cylinder segment by forming intersections with a conical element. In the next step, preliminary surface points are selected from the measured data by means of the roughly determined geometry element, and a geometric best fit element, typically of the same type as the roughly determined geometry element, is computed therefrom. Said element is still imprecise, because not all measurement points and not exclusively those measurement points associated with the feature have been selected. The position, orientation, and size of said best fit element are, however, now more precise than the preliminarily roughly determined geometry element. Said parameters are now used for again selecting the surface points. In practice, the preliminarily roughly determined geometry element is adapted to the best fit element to this end, that is, for example, displaced to the position thereof, and the orientation and size thereof, such as the diameter of a cylinder, are modified accordingly. This is sensible because the manually roughly determined geometry element, as previously mentioned, can already be modified, for example trimmed. The precise measurement result is computed from the surface points selected in the new selection, for example the diameter or the shape deviation of a substitute geometry element or best fit element. Said process can also be repeated multiple times, the more precisely determined geometry element can be used again for the selection, etc.

A further option for defining the specified geometry required for selecting measurement points is the use of further sensors. The measurement points thereof, such as points measured slightly inside a cylinder, can be used for determining a best fit element defining the specified geometry. The features used for trimming and forming intersections can also be measured by means of a further sensor. A fundamental prerequisite is that the sensors used take measurements in the same coordinate system. This is typically achieved by calibrating the sensors. In contrast to calibrating the workpiece location, said process serves to determine the positions of the measurement points generated by a plurality of sensors relative to each other, particularly by determining the offset and orientation of the sensors relative to each other while considering the working distance of each. Alternatively, the measurement points of both sensors can also be transferred into the same coordinate system by subsequent manipulation by means of a best fit. This is only possible, however, if suitable geometries are present on the workpiece.

The further sensors are typically disposed in a coordinate measuring machine or form the same together with the computer tomography sensor.

This also results in the potential for using the same measurement strategy for the measurements using both sensors, such as by using measurement points from exactly the same region for determining a feature. The measurement points of the further sensor can thereby be used for defining the specified geometry, as previously described. The specified geometry is then limited to the regions in which measurement points have been determined using the further sensor. For example, points on only four surface lines of a cylinder are measured by means of a tactile or tactile-optical sensor, for example by scanning Best fit planes are computed from each set of opposite surface lines and act as the specified geometry. If the quantity of surface points measured by means of the computer tomography sensor are then intersected with said planes, the points used for evaluation are selected, that is, for measuring the cylinder.

The points thus selected are thus present in the same region. Said identical point structure enables a further potential, namely the use of the measurement results of a more precise sensor for correcting the computer tomography measurement results. For example, only those measurement points are thereby corrected that have been measured in the same region using both or a plurality of sensors, that is, that are spatially associated with each other. Measurement points lying in a specifiable environment of the correction measurement points generated by means of the further sensor can also be corrected. The correction then takes place according to the method described in WO 2008128978 A2. The precision of the measurement results can thereby be improved. Particularly for series measurements of identical parts, the correction points need to be determined only once on a master part by means of the further sensor or sensors and can then be used for correcting the measurement results of the further part in the series, which need only be quickly measured by means of the computer tomography sensor.

A further prerequisite for high precision is that the feature is disposed and aligned in a favorable position in the measurement beam of the computer tomography sensor. Typically the greatest potential imaging scale should be set for this purpose. This is the case if the feature, such as the injection orifice of a fuel injector, is disposed as close as possible to the radiation source, wherein said feature is nevertheless completely imaged on the detector in all rotational orientations.

In addition to the position, the rotational orientation also plays an important role, particularly if a plurality of identical workpieces are measured one after the other or if the workpiece is measured using the further sensor in said orientation. The rotational orientation thus serves as the basis for aligning the present coordinate system and must be reproducibly set for series measurements as well. The region of the workpiece to be measured, such as the injection orifice of a fuel injector, is thereby brought into a defined location. This is done, for example, by placing the workpiece in a clamping fixture on the rotating part of the mechanical axis of rotation, for example comprising a fit in order to reproducibly dispose the workpiece in the same position and location. According to the invention, an alignment element is further placed on the rotating part of the mechanical axis of rotation. Said element is made of one or two cylinder pins, for example, running parallel to the direction of the axis of rotation. The perpendicular connecting line between the two cylinder axes of the pins, for example, forms a direction that can be rotated to a predefined axis direction, such as the Y-axis of the coordinate measuring machine. An alignment can also take place by means of a single cylinder pin. To this end, for example, the perpendicular connecting line between the cylinder axes of one cylinder pin and a further cylindrical element for securing the workpiece, such as a cylindrical dowel pin or a cylindrical opening in the workpiece fixture also running parallel to the direction of the axis of rotation and in this case as close as possible to be congruent therewith. Rotating said connecting line can, in turn, be done about the Y-axis, but also about an axis running perpendicular to the Y-axis and to the direction of the axis of rotation, which runs for example in the X-direction, that is, the Z-axis.

The alignment element can also be measured by means of the further sensors for defining or comparing the coordinate systems. In order to allow a reproducibly identical fixturing of at least partially rotationally symmetrical workpieces such as a fuel injector, or to unambiguously detect the rotational orientation, such workpieces typically comprise geometric features that can be unambiguously associated, such as laser marking stripes or the like, or grooves, typically in the outside region, or eccentric holes. The orientation or rotational orientation is thereby defined in the fixture and can be set with respect to the axis defined by the alignment elements. The workpiece can thus also always be rotated to the same rotational orientation according to the marking, or the angle offset can be used for coordinate transformation into a uniform coordinate system. The rotational orientation can be set uniformly prior to starting the computer tomography measurement, in that the alignment elements or the markings on the workpiece are always brought into the same rotational orientation, the so-called starting rotational orientation. To this end, measurements using the computer tomography sensor and/or further sensors, also known as preliminary measurements, are possible. The alignment into the correct position and rotational orientation, or inclusion in the rotational orientation for adjusting the coordinate system, such as for series measurements, occur automatically, for example within a CNC run. If there are no markings that can be captured by means of computer tomography on the workpiece, such as flat areas, or if no laser markings or no further sensor for capturing the laser markings are present, then typically two additional eccentric inner holes are made in the workpiece, such as for fuel injectors. In this case, the alignment elements are used as a securing means for the workpiece. Said elements are eccentric to the axis of rotation, such that the cylindrical workpiece is disposed in the center of the axis of rotation. The rotational orientation of the workpiece can thereby be reproducibly set identically and the workpiece coordinate system is known.

A further prerequisite for precise measurement is precise knowledge of the imaging scale at exactly the position in which the region to be measured is disposed. To this end, according to the invention, the calibration bodies used for determining the imaging scale, such as a calibrated sphere, are disposed at precisely said location and the imaging scale is determined, preferably by comparing the calibrated diameter with the diameter determined by means of the computer tomography sensor.

According to the invention, further measures for obtaining optimal measurement results using the computer tomography sensor are taken when measuring fuel injectors. Said measures include correcting for artifacts, particularly correcting for beam hardening, using focal point diameters of the radiation source of less than about 10 μm, applying a beam filter, preferably made of gold and having a thickness of about 0.1 mm, in front of the radiation source, setting the voltage of an X-ray radiation source to about 190 kV to 200 kV, and measuring using the computer tomography sensor while rotating the mechanical axis of rotation. According to the invention, one or more of said measures are taken.

In order to achieve the object of the invention, a device is also substantially proposed, having at least one computer tomography sensor system comprising at least a radiation source, mechanical axis of rotation, and detector, preferably a planar detector, for determining the geometry of a structure on a workpiece or tool, wherein surface measurement points can be generated by means of the computer tomography sensor system, preferably in the region of material transitions, wherein a clamping fixture is mounted on the rotating part of the mechanical axis of rotation and comprises means for securing the workpiece, such as a fuel injector, and means for securing an alignment element, wherein the alignment element can be captured by the computer tomography sensor system, but also preferably by further sensors.

Workpieces are first placed on cylindrical dowel pins or clamped in chucking jaws, that is, received on the inner region or on the outer region. A reproducible location and orientation, and optionally centering, is thereby achieved. In the case of fuel injectors, the centric inner cylinder of the nozzle is placed on a dowel pin typically disposed centered on the mechanical axis of rotation. It is also possible, however, to place the injector in a cylindrical opening by means of the outer cylinder. The workpiece also typically receives a marking, such as laser marking lines or a groove, typically in the outer region, or eccentric holes, for identifying the rotational orientation. The rotational orientation can thereby be set at least roughly. Fine alignment is possible by calibrating by means of a preliminary measurement.

The alignment elements also mounted on the mechanical axis of rotation are made of the same material as the workpiece to be measured wherever possible, or of a material of approximately the same density, or more precisely, the same mass number. This results in approximately identical attenuation of the measurement beam and an adjustment of the radiation characteristic of the X-ray source, such as the acceleration voltage, current, and optionally mechanical prefilters, can easily be found by means of which the workpiece and the alignment element can be radiographically penetrated at high contrast, or at all.

In order to calibrate the imaging scale at the same position at which the measurement object will later be disposed, the same clamping fixture is used for securing the calibration body as will be used for the workpiece to be measured later. To this end, the calibration sphere is place on the same dowel pin as the fuel injector, for example, optionally indirectly by means of an adapter.

The invention is characterized by a method for determining the geometry of a structure on an object such as a workpiece or tool at least by using a computer tomography sensor system comprising at least a radiation source, a mechanical axis of rotation, and a detector, preferably a planar detector, wherein surface measurement points are generated by the computer tomography sensor system, preferably in the region of material transitions, wherein surface measurement points are used for determining the geometry features, said points being associated with the geometry features to be determined on the basis of specifiable rules.

The invention is particularly characterized in that surface measurement points are associated with the geometry features to be determined on the basis of specifiable rules, such as preferably including the specified geometry, particularly preferably including the surface vector of the specified geometry, wherein the specified geometry of the features is at least roughly defined by measuring a master part and/or by means of one or more geometric elements and/or by means of a parameter set and/or by means of manually defined geometric elements at least roughly defined by the user, wherein the specified geometry is preferably determined by means of a best fit of the measurement points selected for the definition or of the points taken from the parameter sets, associated with the geometry features to be determined, and the geometry features are determined from the associated surface measurement points, preferably by means of a best fit.

It is preferably provided that surface measurement points lying within a maximum specifiable distance A, preferably A≤100 μm, particularly A≤50 μm, from a specified geometry.

The invention is particularly characterized in that the selection of the surface measurement points to be used for determining the geometry features takes place under consideration of the surface vector of the specified geometry.

According to a particularly preferred inventive proposal, one or more features lying at an angle to each other in space, such as holes, are measured, preferably with respect to the axis of symmetry of the object, for determining the geometry of a structure on an object such as a workpiece or a tool, at least by using a computer tomography sensor system comprising at least a radiation source, a mechanical axis of rotation, and a detector, preferably a planar detector, wherein surface measurement points are generated by means of the computer tomography sensor system, preferably in the region of material transitions.

It is particularly preferred if at least the elevation and/or azimuth angle and/or location in space and/or diameter and/or diameter course and/or roughness are determined.

It is preferably provided that one or more regions, preferably injection orifices, of fuel injectors are measured by means of the computer tomography sensor system and/or at least one further sensor, preferably a tactile or optical or tactile-optical sensor.

The invention is further characterized in that specified dimensions and/or specified geometry of the features are defined and calibrated by measuring a master part.

The invention is particularly characterized in that the specified geometry is made of one or more geometric elements such as a line, line segment, circle, circular segment, sphere, spherical segment, cylinder, cylindrical segment, cone, conical segment, torus, toroidal segment, and is not defined by a preexisting CAD model, preferably defined by the geometric elements of at least one CAD element of the specified geometry.

It is further noted that the specified geometry is defined by at least one parameter set preferably made of three spatial coordinates (x, y, z) and/or at least one angular location (phi, theta) or axis location (dx, dy, dz) and/or plane (x, y, z, dx, dy, dz) and/or further geometric elements defined in space and preferably limited in extent, preferably defined by the parameter set of geometric elements and/or CAD elements of the specified geometry.

Preferably, according to the invention, the geometric elements to be used for defining the specified geometry are manually at least roughly defined by the operator and preferably a more precise determination is performed by a computer program by means of the following steps:

Using the roughly determined geometric element for preliminarily selecting the surface points Computing a geometric best fit element from the selected surface points, wherein the type of the best fit element corresponds to that of the manually determined geometric element Adapting the manual geometric element to the geometric best fit element Using the adapted manual geometric element for finally selecting the surface points.

It is further noted that geometric elements are computed from measurement points of the further sensor, the measurement points thereof being present in a common coordinate system by aligning and/or by calibrating the further sensor to the computer tomography sensor system.

Preferably, according to the invention, a sensor integrated in a coordinate measuring machine together with the computer tomography sensor system is used as the further sensor.

The invention is also characterized in that geometry features are measured by means of the computer tomography sensor system and a further sensor using the same measurement strategy, wherein the measurement points that were used for computing the geometric element for defining the specified geometry are preferably used for evaluation by the further sensor.

The invention is particularly characterized in that the measurement points of the further sensor are used for correcting each of the measurement points of the computer tomography sensor system that are spatially associated with the measurement points of the further sensor, preferably lying within a specifiable maximum distance from the measurement points of the further sensor, wherein the measurement points of the computer tomography sensor system selected by means of the specified geometry and formed from the geometric elements computed from the measurement points of the further sensor are preferably corrected, and said measurement points of the further sensor are used for correcting.

According to a particularly notable proposal of the invention, the region to be measured on the object, preferably an injection orifice of a fuel injector, is disposed, preferably automatically, in a suitable location between the radiation source and the detector, preferably as close as possible to the radiation source, so that the region to be measured is completely imaged on the detector in all rotational orientations.

It is particularly noted that the rotational orientation of the mechanical axis is preferably automatically set prior to measuring by means of the computer tomography sensor system, such that the region to be measured on the workpiece, preferably an injection orifice of a fuel injector, is disposed in a previously defined location, preferably in that an alignment element disposed on the mechanical axis of rotation, such as cylinder pins running parallel to the axis of rotation, and/or a marking on the workpiece, is captured by means of the computer tomography sensor and/or a further sensor.

The invention is further characterized in that the scale of the image of the computer tomography sensor system is determined by means of a calibration body, preferably a calibrated sphere, disposed at the same location where the region of the workpiece to be measured will later be disposed.

The invention is particularly characterized in that deviations in the relative position of the mechanical axis of rotation with respect to the rest of the computer tomography sensor system are detected in that the location of a drift body such as a drift sphere is determined, and the deviations are corrected, preferably by positioning the mechanical axis of rotation and/or the radiation source and/or the detector by means of mechanical motion axes and/or by shifting the recorded radiographic images.

It is further particularly noted that the location of the drift body is determined by means of a further sensor, preferably an optical sensor, particularly preferably an image processing sensor, and/or a radiographic image recorded by means of the computer tomography sensor is used for determining the same, wherein the measurement takes place in one or more defined rotational orientations of the mechanical axis of rotation, preferably the starting rotational orientation, or in rotational orientations offset by 180° each by means of a shifting method.

Preferably, according to the invention, a coordinate system, preferably a common coordinate system, is defined for the measurement results of the computer tomography sensor and preferably further sensors, in that at least one axis running perpendicular to the axis of rotation is defined by an alignment element disposed on the mechanical axis of rotation, such as cylinder pins running parallel to the axis of rotation, in that the alignment element is captured by means of the computer tomography sensor and/or the further sensors.

The invention is particularly characterized in that a coordinate system, preferably a common coordinate system, is defined for the measurement results of the computer tomography sensor and preferably further sensors, in that a marking on the object is captured by means of the computer tomography sensor and/or the further sensors.

It is particularly further noted that a plurality of identical objects or regions on the objects, preferably fuel injectors, are measured in sequence, preferably by disposing in the same orientation and location in a clamping fixture.

Preferably, according to the invention, when measuring a fuel injector:
- a manual or automatic artifact correction, particularly beam hardening correction, takes place for the computer tomography sensor, and/or
- the focal point of the radiation source is set to a diameter less than about 10 μm, and/or
- a beam filter, preferably made of gold and having a thickness of about 0.1 mm, is placed in front of the radiation source, and/or
- the voltage of an X-ray radiation source is set to about 190 kV to 200 kV, and/or
- the measurement using the computer tomography sensor takes place while the mechanical axis of rotation is rotating.

In the interest of completeness it is noted that examples of best fit elements—as is known to a person skilled in the art—are geometric elements such as a line, line segment, circle, circular segment, sphere, spherical segment, cylinder, cylindrical segment, cone, conical segment, torus, or toroidal segment.

When adapting to a best fit element, as is also known to the person skilled in the art, the deviations between the measurement points and a best fit element are minimized and the resulting best fit element and the location thereof relative to the measurement points are processed. The distances between said best fit element and the measurement points are further evaluated and only those measurement points falling below a specified distance from the best fit element, for example, are evaluated.

The invention is further characterized by a device for determining the geometry of a structure on an object such as a workpiece or a tool, at least made of a computer tomography sensor system comprising at least a radiation source, a mechanical axis of rotation, and a detector, preferably a planar detector, wherein surface measurement points can be generated by the computer tomography sensor system, preferably in the region of material transitions, wherein a clamping fixture comprising means for securing the object and means for securing an alignment element and/or drift body is mounted on the rotating part of the mechanical axis of rotation, wherein the alignment element and/or the drift body can be captured by the computer tomography sensor system and/or a further sensor.

The device is particularly characterized in that a clamping fixture is mounted on the rotating part of the mechanical axis of rotation and comprises means for securing the object and means for securing an alignment element predefining at least one axis direction of a coordinate system and/or rotational orientation of the mechanical axis of rotation, and/or a drift body suitable for determining the deviations in the relative position of the mechanical axis of rotation with respect to the remainder of the computer tomography sensor system, particularly the offset between the mechanical axis of rotation and the detector or the X-ray source (1), wherein the alignment element and/or the drift body can be captured by the computer tomography sensor system and/or a further sensor.

A device according to the invention is further characterized in that the means for securing the object is cylindrical in shape and preferably comprises a fit and/or centering, preferably for securing a fuel injector on the inner cylinder or the outer cylinder.

Particularly according to the invention, the alignment element is made of one or two cylindrical pins, preferably aligned parallel to the axis of rotation, wherein the alignment elements preferably serve as the means for securing the object.

The invention is further characterized in that the alignment element is made of a material having the same density or nearly the same density as the object, preferably of steel.

Preferably, according to the invention, the means for securing the object are designed for receiving a calibration body.

A device according to the invention is further characterized in that drift body is mounted by disposing the same in a material, preferably foam, said material attenuating the measurement radiation of the computer tomography sensor less in comparison with the drift body, preferably resulting in a maximum of 50% of the attenuation of the drift body.

Particularly, according to the invention, the drift body is secured by disposing in an opening such that the drift body can be captured by the further sensor, preferably a tactile sensor or an image processing sensor using incident light or transmitted light, in at least at one rotational orientation of the mechanical axis of rotation.

Particularly, according to the invention, the computer tomography sensor system and preferably at least one further sensor are integrated in a coordinate measuring machine.

Further details, advantages, and features of the invention arise not only from the claims, the features to be found therein—as such and/or in combination—but also from the following description of a preferred embodiment example found in the drawings.

BRIEF DESCRIPTION OF THE DRAWINGS

Shown are.

DETAILED DESCRIPTION OF THE INVENTION

Figure 1:
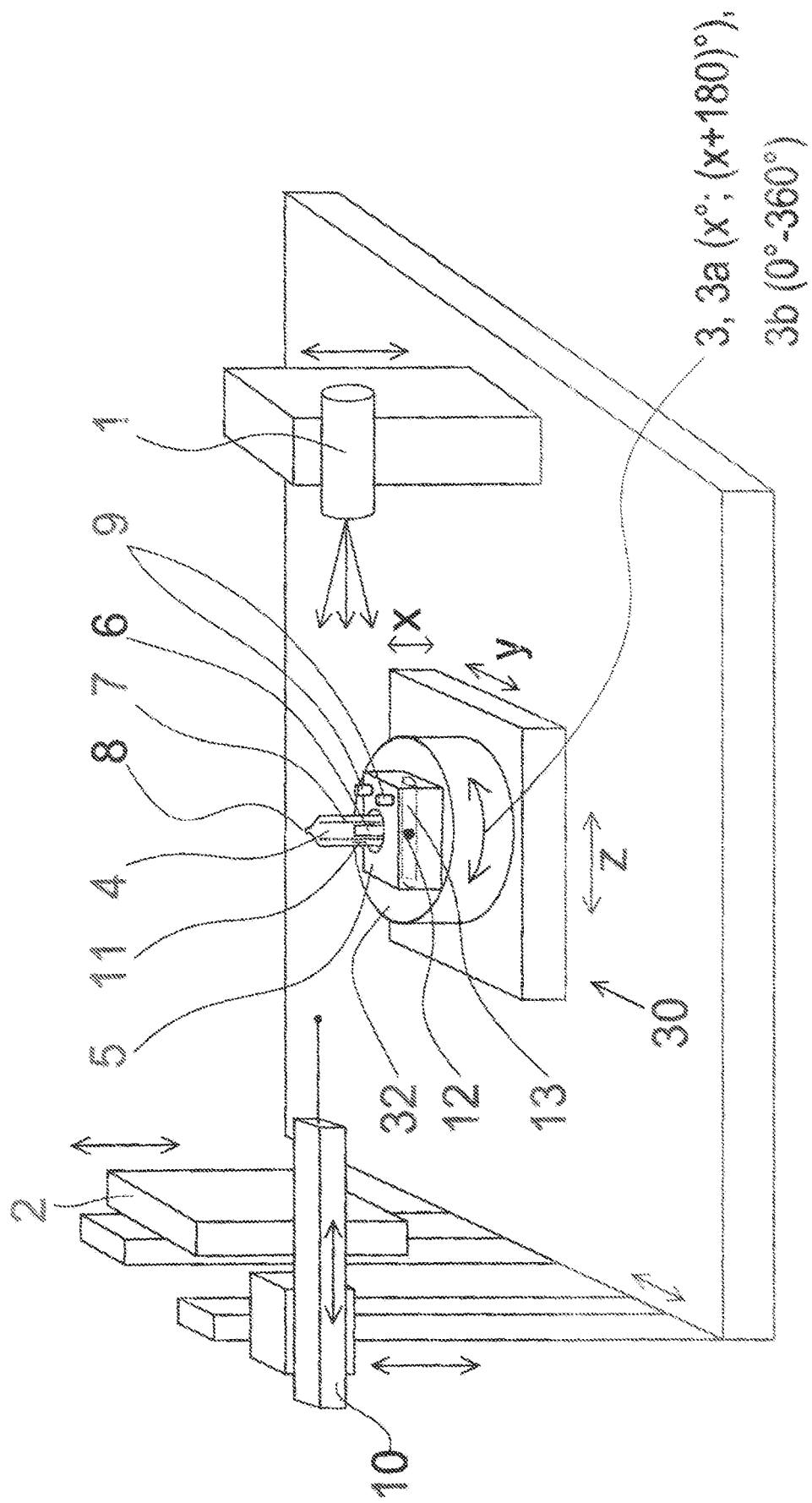
FIG. 1 An arrangement according to the invention of a computer tomography sensor, a further sensor, and the workpiece to be measured, as well as accessories for the clamping fixture, FIG. 2 A special embodiment of a segment of the arrangement according to the invention, and FIG. 3 A flow diagram for clarifying the steps when evaluating features.

FIG. 1 shows a computer tomography sensor made of a radiation source 1, here an X-ray radiation source, a beam detector 2, and a mechanical axis of rotation 30, the rotating part 32 thereof being able to rotate in the direction of an arrow labeled as 3 (x°), 3a (x+180°), and 3b (0°-360°), that is about an axis parallel to the X-axis, shown by the arrow labeled x.

The mechanical axis of rotation 30 can also be displaced along the arrows x, y, and z in all mechanical axes of motion in order to bring a workpiece present on the mechanical axis of rotation 30 into the desired location relative to the remainder of the computer tomography sensor system. The axes of motion can be positioned by means of a CNC control program to this end. X, Y, Z are the axes of a coordinate system, particularly the Cartesian coordinate system.

Further shown is a clamping fixture, such as a clamping chuck, supporting the workpiece 4 and present on the mechanical axis of rotation 30, that is, the rotating part 32 thereof. The workpiece 4 is thereby placed with a close fit on the inner cylinder 7, shown as a dashed line in the figure, on the securing means 6, such as a cylinder pin set in the center of the clamping chuck. The location of the workpiece is thereby reproducibly defined. In order to be able to detect and adjust the rotational orientation of the workpiece 4, a marking 11, such as a laser marking, is typically provided on the outer cylinder of the workpiece 4. Said marking is, for example, a line running briefly in the direction of the arrow x that can be detected by the operator for rough alignment.

Figure 2:
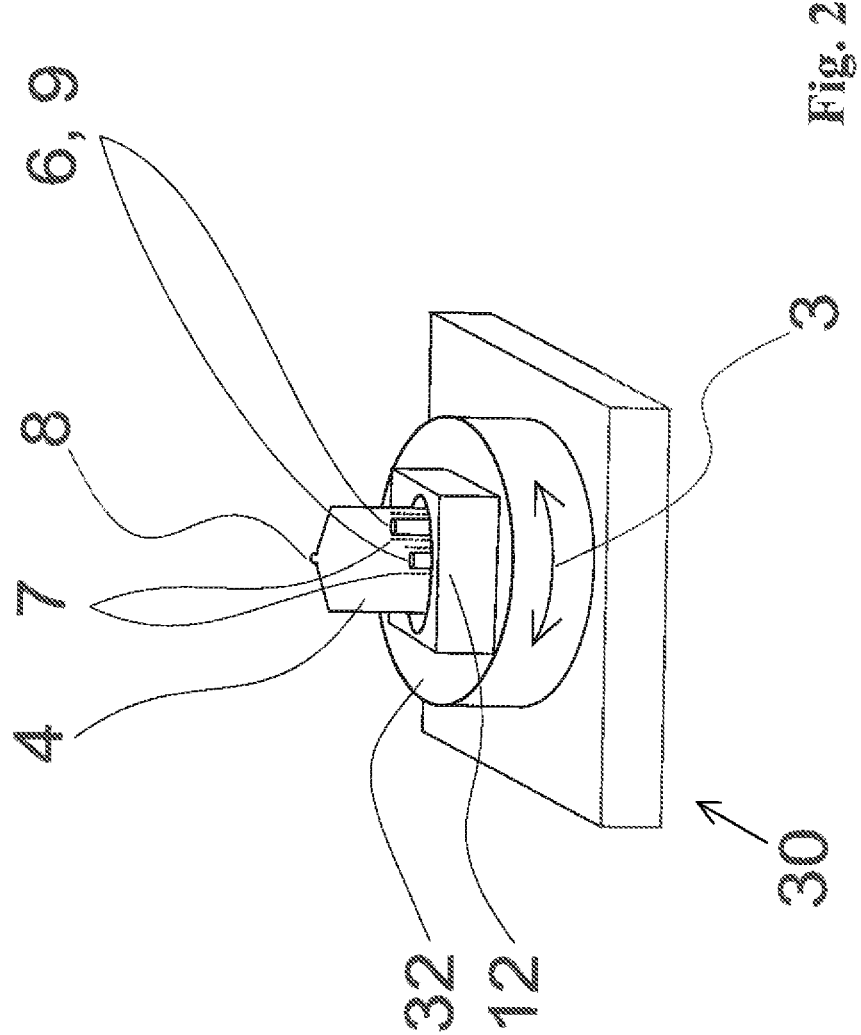

The laser marking is captured by means of an optical sensor for fine adjustment, and by rotating the mechanical axis of rotation 30 into a specified position. There also exist, however, workpieces such as gasoline fuel injectors, where the cylindrical circumference is flattened on one defined side. The rotational orientation of the workpiece is then made using the measurement points on the flattened area determined by means of the computer tomography sensor, such as by fitting a plane into the measurement points of the flattened area. In a third embodiment, workpieces such as fuel injectors 4 are produced having two eccentric inner bores 7. This is shown in FIG. 2, particularly reference number 7, representing an excerpt from FIG. 1, but shown in said special embodiment. In this case, alignment elements 9, such as two cylinder pins, are used as securing means for the workpiece. Said elements are eccentric to the axis of rotation, such that the cylindrical workpiece is disposed in the center of the axis of rotation.

A calibration body, not shown, can also be secured on the securing means, for example in that said body also comprises a fit matching the cylinder pin. The imaging scale can thereby be determined at precisely the position in which the workpiece 4 is present during the actual measurement.

Alignment elements 9, eccentric to the center of the clamping fixture 5, are also present on the mechanical axis of rotation 30, preferably on the rotating part 32 thereof, here for example mounted directly on the clamping fixture 5. Arrangement directly on the rotating part 32 of the mechanical axis of rotation 30 is also possible. For example, two alignment elements 9 are disposed offset in the Y-direction, that is, along the arrow y. Said elements both have a cylindrical shape, wherein the cylinder axis parallel extends parallel to the arrow x, that is, parallel to the direction about which the rotating part 32 of the mechanical axis of rotation 30 rotates, that is, about the axis of rotation. By rotating the mechanical axis of rotation 30, the alignment elements 9 can be rotated into position precisely in the Y-direction and define the Y-axis of the device. To this end, the location of the alignment elements is captured by means of the computer tomography sensor or, if present, the further sensor 10. If the alignment elements 9 are then used for securing the workpiece as well, then the rotational orientation of the workpiece 4 can thus be reproducibly set and the workpiece coordinate system is known.

Also shown is a drift body 12 integrated in the clamping fixture, here for example in the form of a sphere. Said body is disposed in an opening 13 of the clamping fixture 5 and thus can be measured by a further sensor 10 in one or two rotational orientations of the mechanical axis of rotation 30. The securing is implemented in detail such that the sphere is secured only at three to four points on the circumference thereof, so that the measurement can take place at the exposed circumference. It is also thereby possible to measure by means of an image processing sensor using incident light or transmitted light. A corresponding transmitted light device, not shown here, is also mounted on the mechanical axis of rotation 30, according to the invention. Alternatively or additionally, the drift body 12 is measured using the computer tomography sensor. To this end, the drift body 12 is disposed in a material such as foam that absorbs the measurement radiation much less than drift body 12 itself does. The foam is disposed in the opening 13, for example. In both cases, the position of the drift body 12, such as the location of the center point of the drift sphere, is determined. Said measurement occurs on a radiographic image by means of the computer tomography sensor, or by means of measuring the shift in two radiographic images offset by 180°, without requiring a reconstruction, wherein preferably image processing methods are used.

The position of the drift body 12 is determined repeatedly between the various measurements, whereby offsets between the mechanical axis of rotation 3 and thus the workpiece 4 or the additional elements 5, 6, 9, 11 disposed on the mechanical axis of rotation 3 and the detector 2 or the X-ray source 1 are detected and corrected.

The further sensor 10 is shown as an example and is a tactile sensor in the embodiment example. The computer tomography sensor and the components thereof, as well as the further sensor 10, can be positioned according to the arrows in the drawing. The presence of axes of motion is, together with the ability to determine positions for measurements points, a characteristic indicating the present of a coordinate measuring machine.

The region of the workpiece 4 to be measured, here a fuel injector, is labeled as 8 and comprises injection orifices, for example, that are not shown in the figure. To this end, the region 8 is positioned as close as possible to the radiation source 1 in the direction of the arrow z, in order to achieve as high a magnification of the image on the detector 2 as possible, and thus high resolution and precision. When rotating the workpiece 4, however, collisions with the radiation source 1, for example, must not occur, and the region 8 must always be completely imaged on the detector 2. The region 8 can thereby also be broken down into partial regions measured one after the other. The partial measurement results are then merged together. Corresponding methods are known under the term raster tomography, or tomography "on the image."

If the location of the alignment elements 9 is also to be considered, then said elements must be measureable using at least one sensor. If no further sensor 10 is present, then the alignment elements are captured according to the invention by the computer tomography sensors, whereby the position of the workpiece must be correspondingly set somewhat further away from the radiation source, so that the alignment elements 9 can also be imaged on the detector 2 in all rotational orientations. Alternatively, a separate measurement can be performed for determining the position of the alignment elements 9. In addition, the alignment elements 9 should be made of the same material as the region 8 to be measured in order to ensure high-contrast radiographic transparency as previously indicated.

If measurement data recorded by means of the computer tomography sensors and recorded by means of the further sensor 10 are combined, then the region 8 to be measured and optionally the alignment elements 9 are captured by means of both sensor sequentially. The potential thereby exists for generating measurement data in the same coordinate system. The rotational orientation of the workpiece 4 is determined precisely by measuring the marking 11 by means of the further sensor 10, because laser marking cannot always be measured precisely enough by means of the computer tomography sensor, or the rotational orientation is defined by securing the workpiece 4 to the alignment elements 9.

The combination of measured data takes place as previously described, in a plurality of ways. For one, the measurement data of the further sensor can be used in order to make a correction to the computer tomography results, but also features can be measured using only one sensor each and the results can be linked to form distances or angles. According to the invention, the measurement data of the further sensor 10 can also be used for defining the specified geometry for selecting the measurement points of the computer tomography sensor to be used for evaluation.

Figure 3:
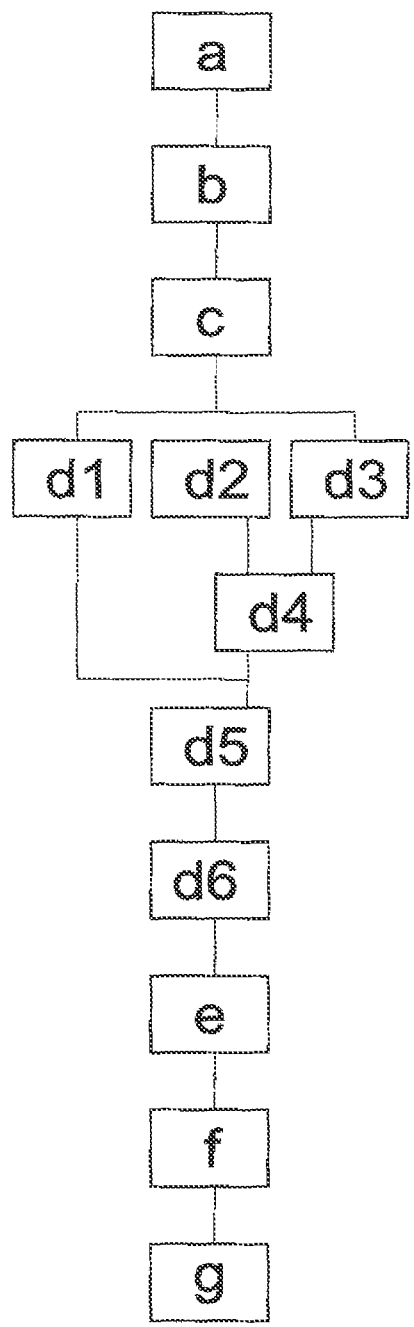

The procedure for evaluating features according to the invention is shown in FIG. 3. It is divided into the following steps:

a) Clamping the workpiece 4 in the clamping fixture 5
b) Aligning the rotational orientation of the workpiece
c) Computer tomographic measurement
d) Rough selection of measurement points (substeps d1 through d6)
e) Computing a geometric best fit element
f) Fine selection of measurement points
g) Computing the final best fit element and the dimensions of the feature.

The steps are explained in more detail below.

Step a) comprises arranging the workpiece 4 on the clamping fixture 5, for example by placing an inner cylinder 7 onto a fit 6 or by placing two additional eccentric inner cylinders (not shown) on the workpiece 4 onto the alignment elements 9.

In step b), the rotational orientation of the workpiece is set unambiguously and repeatably for subsequently measuring the same or identical parts. To this end, either a marking 11 present on the workpiece 4 is captured by the further sensor, or a lateral flat on the component is captured by the computer tomography sensor, or the workpiece is secured on the alignment elements 9 and the mechanical axis of rotation is brought into the corresponding predefined rotational orientation.

The step c) comprises computer tomographic measuring and determining the plurality of surface measurement points.

In step d), the rough selection of measurement points to be used in step e) for computing a geometric best fit element is made. The step d) is thereby subdivided into the following partial steps d1) through d6).

Step d1) presents one of the three alternative possibilities for generating what is known as a CAD element (partial step d5)), said element being used in step d6) for actually roughly selecting measurement points. To this end, so-called manual elements are generated in step d1). Said elements are basic geometric elements such as a circle, cylinder, plane, or cone, or parts thereof. Said elements are generated manually from existing parameters, such as from a 2D drawing or a table having dimensions of the workpiece and the location thereof, and have a limited extent to the specified geometry of the workpiece. The parameters comprise, in the case of a fuel injector, for example, the precise injection orifice geometries and the location of one or more injection orifices, made of three spatial coordinates (x, y, z) and at least one angular location (phi, theta) or axis location (dx, dy, dz), or of a plane (x, y, z as point information and dx, dy, dz as the plane normal vector) and optionally of further geometric elements defined in space and preferably limited in extent. The manual elements are generated by means of said specified data, such as angular locations, positions, and diameters or diameter courses. For example, one such manual element is a spatially limited cylinder representing the specified geometry of a single injection orifice of a fuel injector.

In the first alternative procedure to d1), individual measurement points are selected in substep d2) and a best fit element is computed from said measurement points by means of the computer-aided best fit computation in substep d4). The selection of the individual measurement points is performed manually by the operator, in that the operator selects regions on the workpiece that are surely associated with only the geometrical element or feature in question. In order to achieve a spatial limit, in turn, measurement points of adjacent regions are measured, for example, and geometric best fit elements are determined therefrom. For example, a cylinder can be limited by the limiting planes in the case of a through hole, such as an injection orifice of a fuel injector. Forming intersections of geometric elements can also sometimes be sensible. For example, a cylinder element can be limited in length to a cylinder segment by forming an intersection with a cone element.

The second alternative comprises measuring individual points using the further sensor (substep d3)), said points being associated only with the geometric element or feature in question. In the subsequent step d4), in turn, a best fit element is computed and optionally limited.

The CAD element (substep d5)) computed in all three alternatives is used for the actual rough selection, a preliminary selection, of measurement points. Thereby only a still incomplete quantity of the measurement points associated with the feature is available at first.

The step e) to be performed thereafter comprises computing a geometric best fit element from the preliminarily selected points. The type of the geometric best fit element preferably corresponds to that of the manually determined geometric element in steps d1) and d4). It is thereby possible to adapt the dimensions, location, and orientation of the computed CAD element (substep d5)) to the geometric best fit element computed in step e), whereby the previously described limits remain intact, and to use said element in step f) for finely selecting measurement points.

In step g), the final best fit element is computed from the finely selected measurement points, and the dimension in question of the feature, such as the diameter of a cylinder, is computed therefrom.

The steps a) through g) are first performed as guided by the operator for teaching a measurement program. Further measurements of identical workpieces, such as for a series measurement, then apply the generated measurement program, whereby operator intervention is eliminated, except for clamping and starting the measurement program.

The invention claimed is:

1. A method for measuring geometry features of a structure on an object using a computer tomography sensor system comprising at least an X-ray radiation source, a mechanical axis of rotation, and a planar detector, the method comprising:
   providing the computer tomography sensor system;
   generating surface measurement points in a region of material transitions using the computer tomography sensor system;
   determining the geometry features without the presence of a CAD model of the object by way of a two-step process;
   in a first step of the two-step process, selecting the surface measurement points that are associated with the geometry features of the structure on a basis of specifiable rules that consider surface measurement points against a CAD element having a target geometry for the structure;
   wherein the CAD element is not derived from a CAD model, wherein the target geometry of the CAD element is defined from one or more geometric elements selected from the group consisting of line, line segment, circle, circular segment, sphere, spherical segment, cylinder, cylindrical segment, cone, conical segment, torus, and toroidal segment, said target geometry being defined by:

a) using at least one parameter set, and/or
b) manual definition at least roughly by a user, and/or
c) measuring a master part; and in a second step of the two-step process, measuring the geometry features by adjustment of a best fit element into the selected measurement points.

2. The method according to claim 1, wherein a scale of an image of the computer tomography sensor system is determined by means of a calibration body disposed at a same location as the region of the object to be measured will later be disposed.

3. The method according to claim 1, wherein surface measurement points that are used as the selected measurement points lie within a distance $A \leq 100$ μm from the target geometry.

4. The method according to claim 1, wherein the selection of the surface measurement points to be used for measuring the geometry features takes into consideration a surface vector of the target geometry.

5. The method according to claim 1, wherein one or more features oriented at an angle to each other in space are measured relative to an axis of symmetry of the object.

6. The method according to claim 1, wherein at least an elevation angle and/or azimuth angle and/or location in space and/or diameter and/or diameter changes along a longitudinal axis and/or roughness are measured.

7. The method according to claim 1, wherein one or more spray holes of a fuel injector as the object are measured by means of the computer tomography sensor system.

8. The method according to claim 1, wherein one or more spray holes of a fuel injector as the object are measured using the computer tomography sensor system, and at least one further sensor selected from a tactile sensor, an optical sensor, and a tactile-optical sensor.

9. The method according to claim 1, wherein the target geometry is defined by at least one parameter set, comprising three spatial coordinates (x, y, z) and at least one angular orientation (phi, theta) or axis location (dx, dy, dz).

10. The method according to claim 1, wherein the target geometry is defined by at least one plane with x, y, z as point information and dx, dy, dz as plane normal vector.

11. The method according to claim 1, wherein the target geometry is defined by further geometric elements that are defined in space.

12. The method according to claim 1, wherein the geometric elements to be used for defining the target geometry are defined manually at least roughly by an operator and a more precise determination than takes place by a computer program by means of the following steps:
preliminarily selecting the surface points by using the roughly determined geometric element;
calculating a geometric best fit element from the selected surface points, wherein the type of best fit element corresponds to that of the manually determined geometric element;
adapting the manual geometric element to the geometric best fit element; and
finally selecting the surface points using the roughly determined geometric element.

13. The method according to claim 1, wherein geometry features are measured by means of the computer tomography sensor system and a further sensor using a same measurement strategy to collect measurement points from exactly the same region(s) of the object, wherein the measurement points collected by the further sensor are used for computing the geometric elements for defining the target geometry.

14. The method according to claim 1, wherein the measurement points of a further sensor are used for correcting each of the measurement points of the computer tomography sensor system spatially associated with the measurement points of the further sensor, wherein the measurement points of the computer tomography sensor system selected by means of the target geometry and formed from the geometric elements computed from the measurement points of the further sensor are corrected and said measurement points of the further sensor are used for correcting.

15. The method according to claim 1, wherein the region to be measured on the object is disposed in a suitable location between the X-ray radiation source and the detector, so that the region to be measured is completely imaged on the detector in all rotational orientations.

16. The method according to claim 1, wherein, prior to starting a measurement by the computer tomography sensor system, a rotational orientation of the mechanical axis of rotation is set, so that the region to be measured on the object is disposed in a location defined in advance, wherein an alignment element disposed on the mechanical axis of rotation or a marking on the object is captured by means of the computer tomography sensor system and/or a further sensor.

17. The method according to claim 1, further comprising recording radiographic images, wherein deviations in the relative position of the mechanical axis of rotation with respect to the rest of the computer tomography sensor system are detected in that the location of a drift body is determined, and the deviations are corrected by positioning the mechanical axis of rotation and/or the detector, and/or the radiation source by means of mechanical motion axes, and/or by displacing the recorded radiographic images.

18. The method according to claim 1, wherein a common coordinate system is defined for the measurement results of the computer tomography sensor and at least one further sensor, in that at least one axis running perpendicular to the axis of rotation is defined by an alignment element disposed on the mechanical axis of rotation so that the rotational orientation of the object can be reproducibly set, in that the alignment element is captured by means of the computer tomography sensor and the at least one further sensor.

19. The method according to claim 1, wherein a common coordinate system is defined for the measurement results of the computer tomography sensor and at least one further sensor, in that a marking on the object is captured by means of the computer tomography sensor and the at least one further sensor.

20. The method according to claim 1, wherein a plurality of identical objects or regions on the objects are measured sequentially by disposing the identical objects or regions on the objects at the same orientation and location in a clamping fixture.

21. The method according to claim 1, wherein when measuring a fuel injector as the object:
a manual or automatic artifact correction, in the form of at least a beam hardening correction, takes place for the computer tomography sensor, and/or the focal point of the radiation source is set to a diameter of less than 10 μm, and/or the voltage of an X-ray radiation source is set to 190 kV to 200 kV, and/or the measurement by means of the computer tomography sensor takes place during the rotation of the mechanical axis of rotation.

22. The method according to claim 8, wherein geometric elements are computed from measurement points of a further sensor, the measurement points thereof being present in a common coordinate system by aligning and/or by calibrating the further sensor to the computer tomography sensor system.

23. The method according to claim 8, wherein the at least one further sensor is integrated in a coordinate measuring machine together with the computer tomography sensor system.

24. The method according to claim 17, wherein the orientation of the drift body is determined by means of a further optical sensor, and/or a radiographic image recorded by means of the computer tomography sensor, wherein the measurement takes place in one or more defined rotational orientations of the mechanical axis of rotation, or by means of a shifting method at two rotational positions each offset by 180°.

* * * * *